(12) United States Patent
Mislak et al.

(10) Patent No.: US 10,563,931 B2
(45) Date of Patent: Feb. 18, 2020

(54) ULTRASONIC ENHANCED HEAT EXCHANGER SYSTEMS AND METHODS

(71) Applicant: Johnson Controls Technology Company, Plymouth, MI (US)

(72) Inventors: Nicholas P. Mislak, Bel Air, MD (US); Douglas A. Kester, York, PA (US); Curtis W. Caskey, Dallastown, PA (US)

(73) Assignee: Johnson Controls Technology Company, Auburn Hills, MI (US)

( * ) Notice: Subject to any disclaimer, the term of this patent is extended or adjusted under 35 U.S.C. 154(b) by 193 days.

(21) Appl. No.: 15/619,245

(22) Filed: Jun. 9, 2017

(65) Prior Publication Data

US 2018/0094879 A1 Apr. 5, 2018

Related U.S. Application Data

(60) Provisional application No. 62/404,669, filed on Oct. 5, 2016.

(51) Int. Cl.
*F28F 13/12* (2006.01)
*F25B 39/00* (2006.01)
(Continued)

(52) U.S. Cl.
CPC .............. *F28F 13/12* (2013.01); *F25B 39/02* (2013.01); *F25B 2500/09* (2013.01)

(58) Field of Classification Search
CPC .... F25B 39/02; F25B 49/02; F25B 2600/021; F25B 2500/09; F28F 13/10; F28F 13/12; Y02B 30/741; F28D 2021/0071
(Continued)

(56) References Cited

U.S. PATENT DOCUMENTS 2,664,274 A 12/1953 Worn et al.
3,789,617 A 2/1974 Rannow
(Continued)

FOREIGN PATENT DOCUMENTS

CN 101196380 A * 6/2008
CN 102620586 A * 8/2012 ......... F28D 15/0266
(Continued)

OTHER PUBLICATIONS

CN-101196380-A: Pipe type heat exchanger with heat exchange shell intensified by ultrasonic wave; Chen (Year: 2007).*
(Continued)

*Primary Examiner* — Cassey D Bauer
*Assistant Examiner* — Kirstin U Oswald
(74) *Attorney, Agent, or Firm* — Fletcher Yoder, P.C.

(57) ABSTRACT

In one embodiment, a cooling system includes an evaporator, which further includes an evaporator tube, a first mechanical wave emitter, and a control system communicatively coupled to the first mechanical wave emitter. The cooling system is configured to circulate refrigerant through the evaporator tube to facilitate heat exchange between the refrigerant and fluid surrounding the evaporator tube. The first mechanical wave emitter is configured to output first mechanical waves to the evaporator tube, and the control system is configured to instruct the first mechanical wave emitter to output the first mechanical waves to enhance nucleation of the refrigerant in the evaporator tube.

18 Claims, 6 Drawing Sheets

(51) Int. Cl.
 F25B 49/00 (2006.01)
 G01N 29/036 (2006.01)
 F25B 39/02 (2006.01)
(58) Field of Classification Search
 USPC .......................................................... 62/132
 See application file for complete search history.

(56) References Cited

U.S. PATENT DOCUMENTS

| 7,261,144 | B2 | 8/2007 | Thome et al. | |
|---|---|---|---|---|
| 7,690,214 | B2* | 4/2010 | Lu | G06F 1/203 |
| | | | | 62/259.2 |
| 2005/0284612 | A1* | 12/2005 | Machiroutu | F28D 15/0233 |
| | | | | 165/104.25 |
| 2007/0251249 | A1 | 11/2007 | Burk | |
| 2008/0196430 | A1* | 8/2008 | McGill | F16K 7/045 |
| | | | | 62/228.1 |
| 2010/0206539 | A1* | 8/2010 | Kim | F24F 11/30 |
| | | | | 165/200 |

FOREIGN PATENT DOCUMENTS

| EP | 0855215 A2 * | 7/1998 | ................ B01J 8/16 |
|---|---|---|---|
| WO | WO-9310404 A1 * | 5/1993 | ............. A61L 9/122 |
| WO | WO-2013102830 A1 * | 7/2013 | ............... B06B 1/02 |

OTHER PUBLICATIONS

CN102620586A; Pulsating heat pipe heat-transferring system sleeved with electric control piezoceramic blocks; Zhao (Year: 2012).*

EP 0 855 215 A2; Method and installation for improving heat and/or mass transfer through the use of a pulsator; Schnitt (Year: 1998).*

Xiaoze Du, et al; Enhancement of Heat and Mass Transfer by Cavitation; Jan. 2015; pp. 1-13.

Mathieu Legay, et al; Enhancement of Heat Transfer by Ultrasound; Review and Recent Advances; vol. 2011, Article ID 670108, pp. 1-18.

Ye Yao; Research and Applications of Ultrasound in HVAC field; Renewable and Sustainable Energy Reviews—May 2016, pp. 1-18.

* cited by examiner

ULTRASONIC ENHANCED HEAT EXCHANGER SYSTEMS AND METHODS

CROSS-REFERENCE TO RELATED APPLICATIONS

This application is a Non-Provisional Application claiming priority to U.S. Provisional Application No. 62/404,669, filed Oct. 5, 2016, entitled "ULTRASONIC ENHANCED EVAPORATOR," which is herein incorporated by reference in its entirety for all purposes.

BACKGROUND

The present disclosure generally relates to cooling systems and, more particularly, to heat exchangers implemented in cooling systems.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Generally, heat exchangers may be implemented in cooling systems, such as air conditioning systems, chiller systems, refrigeration systems, and/or the like. In operation, a heat exchanger may facilitate energy (e.g., heat) exchange between a circulated refrigerant (e.g., coolant) and a surrounding fluid (e.g., water or air). In particular, while circulated in the cooling system, the refrigerant may be cycled through various phases. For example, in an evaporator heat exchanger (e.g., evaporator), the refrigerant may enter an evaporator tube as a liquid, evaporate, and exit the evaporator tube as a vapor. Additionally, in a condenser heat exchanger (e.g., condenser), the refrigerant may enter a condenser tube as a vapor, condense, and exit the condenser tube as a liquid.

While some energy exchange may result due to temperature difference (e.g., sensible heat), much more of the energy exchange between the fluid and the refrigerant in a heat exchanger may occur due to phase change (e.g., latent heat) of the refrigerant. For example, in the evaporator, phase change of the refrigerant from a liquid phase to a gas phase may extract heat from air flowing around the evaporator tube, thereby cooling the air. Thus, heat extraction efficiency of a heat exchanger may be dependent on extent the phase change is completed. For example, heat extraction efficiency of the evaporator may increase as the portion of the refrigerant that is converted to the gas state increases.

BRIEF DESCRIPTION

Certain embodiments commensurate in scope with the originally claimed embodiments are summarized below. These embodiments are not intended to limit the scope of the claimed embodiments, but rather these embodiments are intended only to provide a brief summary of possible forms of the embodiments. Indeed, the embodiments may encompass a variety of forms that may be similar to or different from the embodiments set forth below.

In a first embodiment, a cooling system includes an evaporator, which further includes an evaporator tube, a first mechanical wave emitter, and a control system communicatively coupled to the first mechanical wave emitter. The cooling system is configured to circulate refrigerant through the evaporator tube to facilitate heat exchange between the refrigerant and fluid surrounding the evaporator tube. The first mechanical wave emitter is configured to output first mechanical waves to the evaporator tube, and the control system is configured to instruct the first mechanical wave emitter to output the first mechanical waves to enhance nucleation of the refrigerant in the evaporator tube.

In a second embodiment, a method for operating a cooling system includes determining, using a control system of the cooling system, a first target frequency of a first mechanical wave to be output from a mechanical wave emitter to an evaporator tube as refrigerant is circulated through the evaporator tube. The method also includes instructing, using the control system, the mechanical wave emitter to output the first mechanical wave with the first target frequency to facilitate heat exchange between the refrigerant and fluid surrounding the evaporator tube by agitating the refrigerant.

In a third embodiment, a tangible, non-transitory, computer-readable medium stores instructions executable by one or more processors of a cooling system. The instructions include instructions to determine, using the one or more processors, a first target frequency of a first mechanical wave to be output from a mechanical wave emitter to an evaporator tube as refrigerant is circulated through the evaporator tube. The instructions also include instructions to instruct, using the one or more processors, the mechanical wave emitter to output the first mechanical wave with the first target frequency to facilitate heat exchange between the refrigerant and fluid surrounding the evaporator tube by agitating the refrigerant.

BRIEF DESCRIPTION OF THE DRAWINGS

These and other features, aspects, and advantages of the present embodiments will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
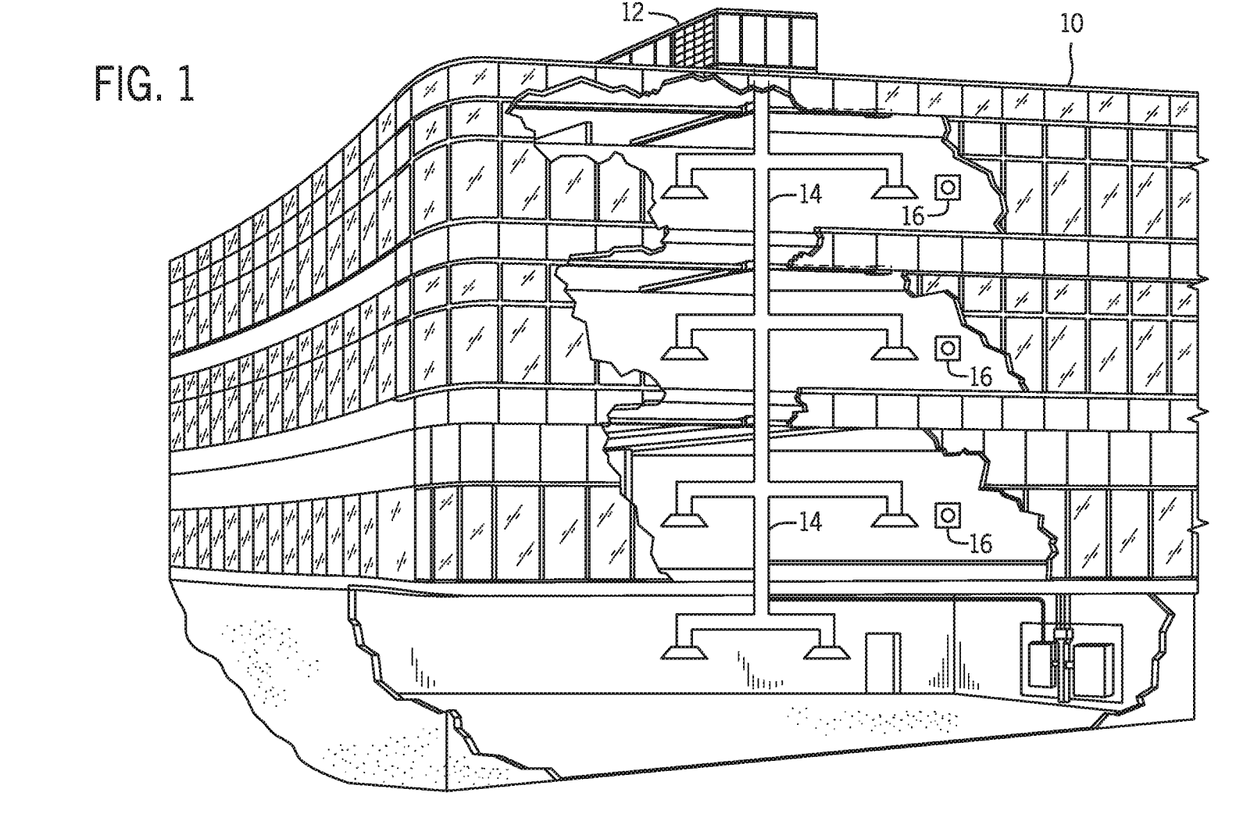
FIG. 1 illustrates a heating, ventilating, and air conditioning (HVAC) system for building environmental management that may employ one or more HVAC units, in accordance with an embodiment.

Turning now to the drawings, FIG. 1 illustrates a heating, ventilating, and air conditioning (HVAC) system for building environmental management that may employ one or more HVAC units. In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
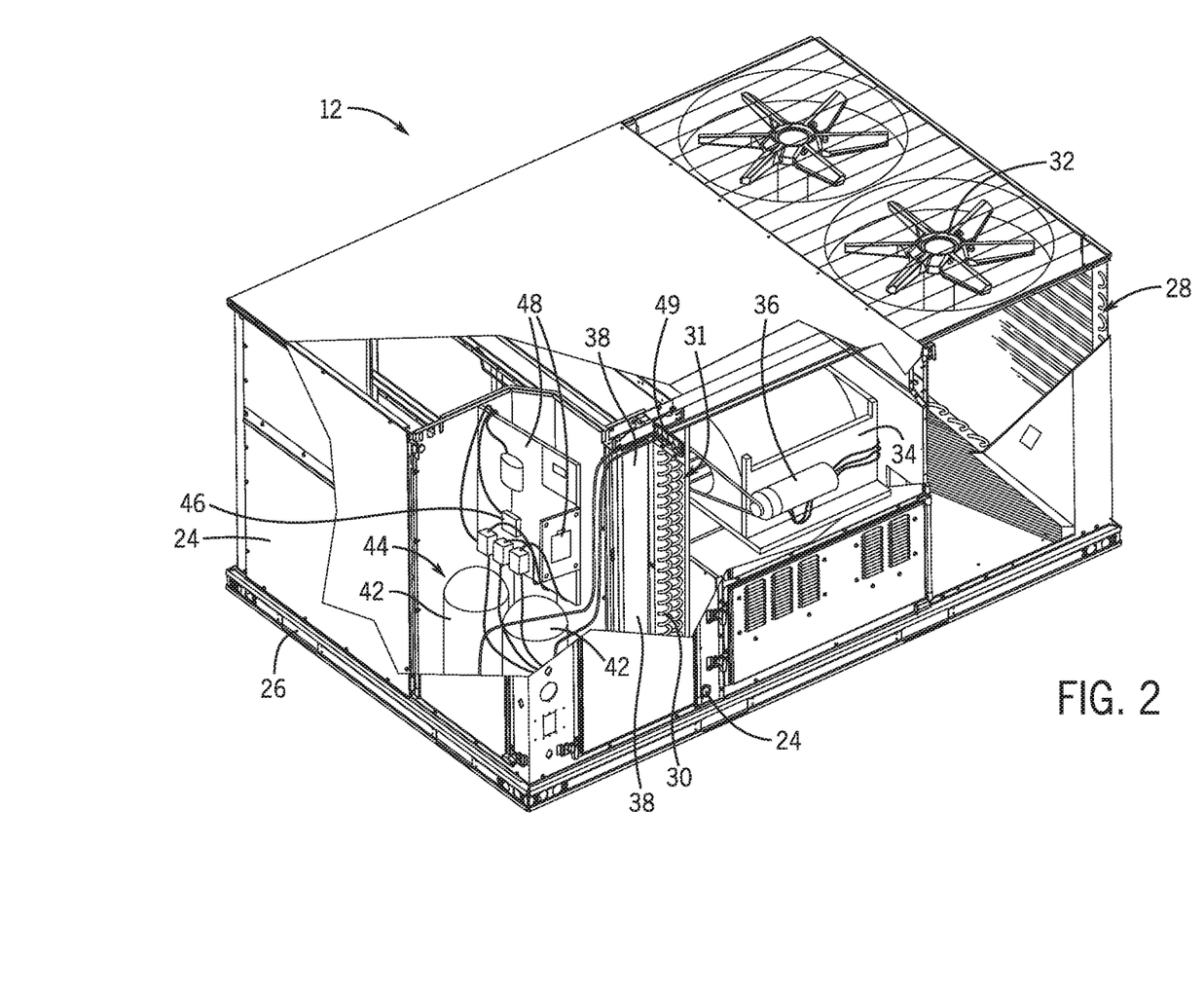
FIG. 2 is a perspective view of an HVAC unit of the HVAC system of FIG. 1, in accordance with an embodiment.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant (for example, R-410A, steam, or water) through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms (one or more being referred to herein separately or collectively as the control device 16). The control circuitry may be configured to control operation of the equipment, provide alarms, and monitor safety switches. Wiring 49 may connect the control board 48 and the terminal block 46 to the equipment of the HVAC unit 12.

Figure 3:
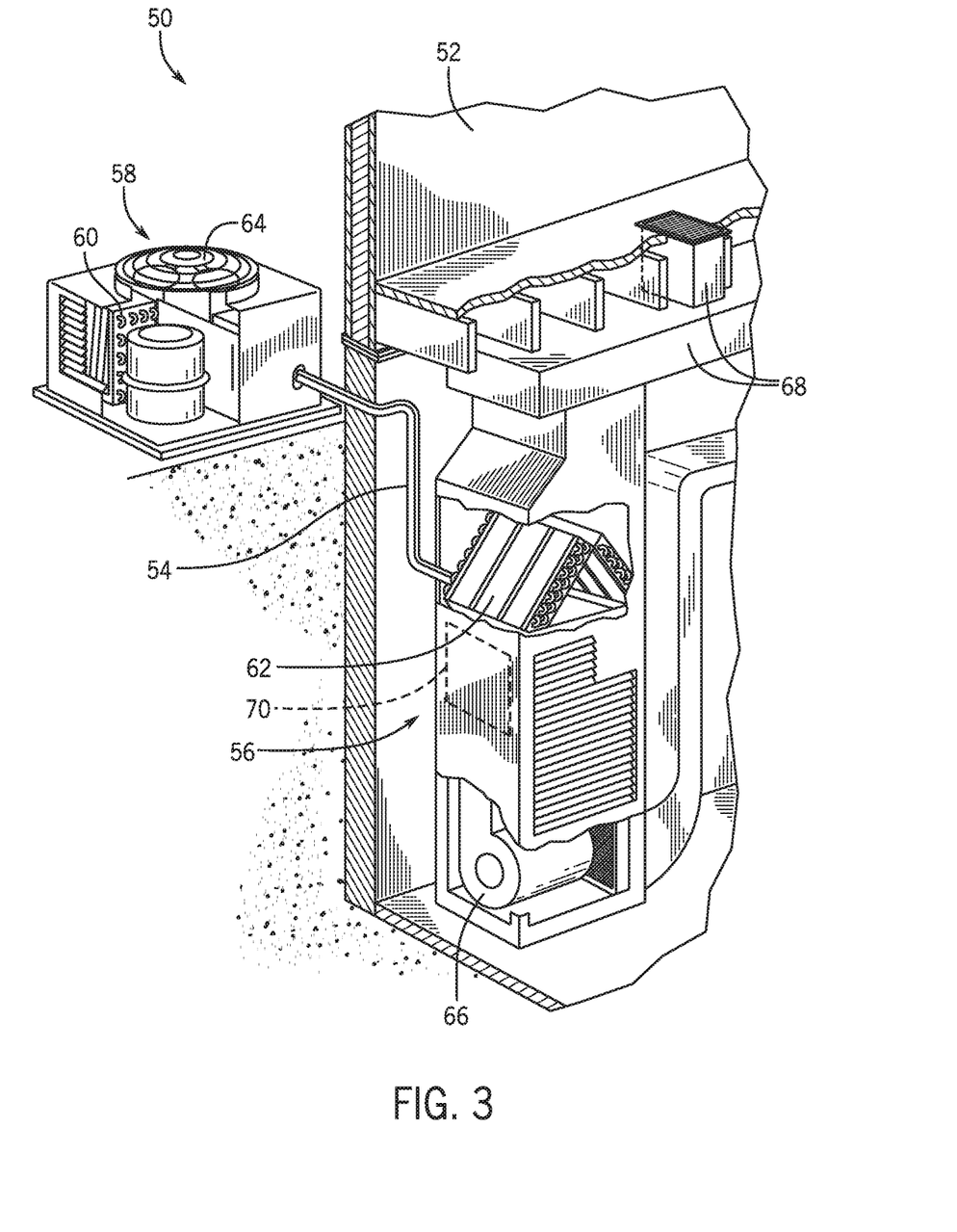
FIG. 3 illustrates a residential heating and cooling system of the HVAC system of FIG. 1, in accordance with an embodiment.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant (which may be expanded by an expansion device, not shown) and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat (plus a small amount), the residential heating and cooling system 50 may become operative to refrigerate additional air for circulation through the residence 52. When the temperature reaches the set point (minus a small amount), the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger (that is, separate from heat exchanger 62), such that air directed by the blower 66 passes over the tubes or pipes and extracts heat from the combustion products. The heated air may then be routed from the furnace system 70 to the ductwork 68 for heating the residence 52.

Figure 4:
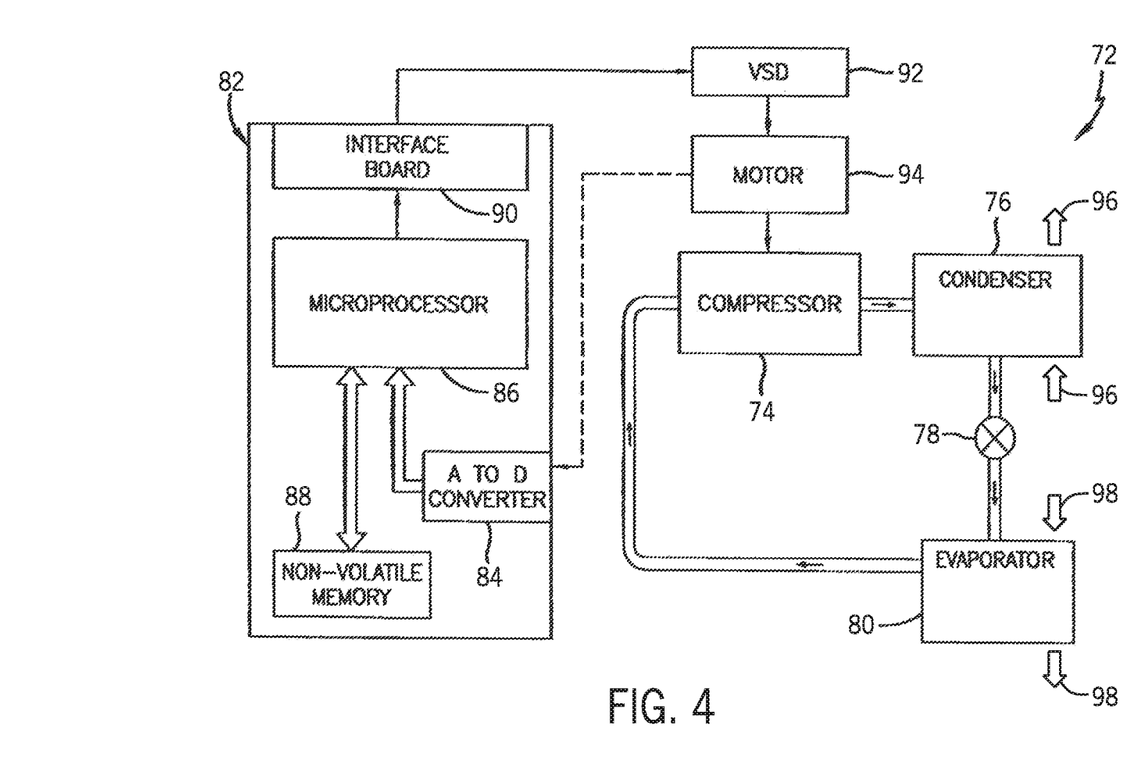
FIG. 4 illustrates a vapor compression system that may be used in the HVAC system of FIG. 1, in accordance with an embodiment.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 38 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC system. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

As will be discussed in detail below, heat transfer may be improved by increasing vaporization of the refrigerant that occurs in the evaporator 80, thereby improving heat transfer efficiency of the evaporator 80. For example, mechanical waves (e.g., ultrasonic waves) may be applied to the evaporator tubes to enhance (e.g., boost or catalyze) vaporization of the refrigerant that occurs in the evaporator 80.

Figure 5:
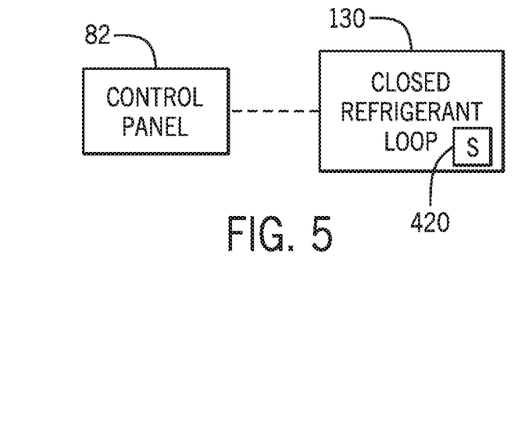
FIG. 5 illustrates the vapor compression system of FIG. 4, in accordance with an embodiment.

To this end, in some embodiments, as depicted in FIG. 5, the control panel 82 may be communicatively coupled to a closed refrigerant loop 130 (e.g., circuit). The closed refrigerant loop 130 may include elements of the vapor compression system 72, such as the compressor 74, the condenser 76, the expansion device 78, and the evaporator 80. Further, the closed refrigerant loop 130 may also include one or more sensors 420.

Particularly, in some embodiments, the sensors 420 may facilitate controlling operation of the closed refrigerant loop 130 by determining operational parameters of the closed refrigerant loop 130. For example, the sensors 420 may include one or more temperature sensors that determine temperature of the refrigerant, temperature of fluid flowing through the closed refrigerant loop 130, temperature of components (e.g., the evaporator 80) in the closed refrigerant loop 130, and an ambient air temperature. Additionally or alternatively, the sensors 420 may include one or more pressure sensors that determine pressure of the refrigerant, pressure of fluid flowing through the closed refrigerant loop 130, internal pressure of components (e.g., the evaporator 80) in the closed refrigerant loop 130, and/or external pressure of components in the closed refrigerant loop 130.

Figure 6:
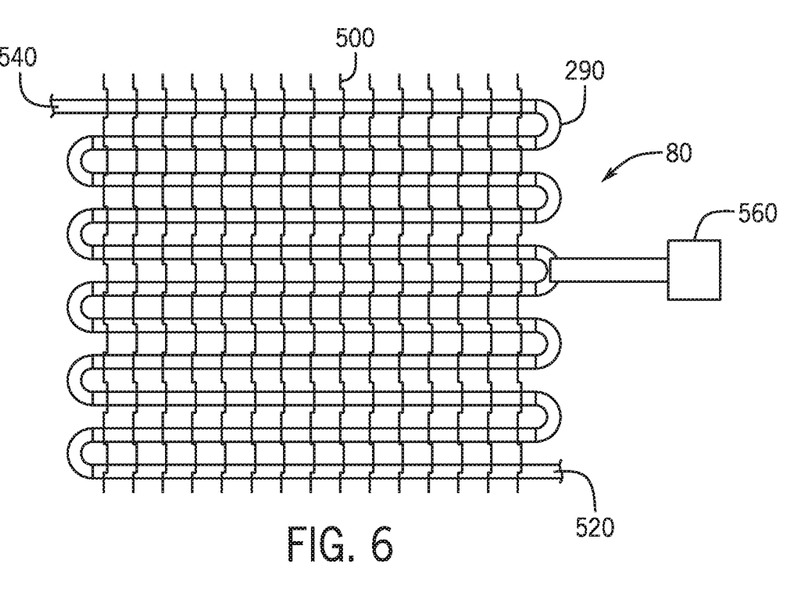
FIG. 6 illustrates an evaporator implemented in the vapor compression system of FIG. 4, in accordance with an embodiment.

In some embodiments, the reduced temperature of the supply air stream 98 from the evaporator 80 may decrease the ambient temperature to match the set point temperature. To help illustrate, FIG. 6 depicts an embodiment of the evaporator 80 that may be used to produce the supply air stream 98 (with the reduced temperature) with improved efficiency. Particularly, refrigerant may flow through evaporator tubes 290 of the evaporator 80 from an inlet 520 to an outlet 540 while absorbing heat from air 500 (e.g., supply air stream 98) drawn across the evaporator tubes 290, thus reducing the temperature of the supply air stream 98. For example, the refrigerant may enter the inlet 520 substantially in a liquid phase, absorb heat from the air 500 as it traverses the length of the evaporator tubes 290, and exit the outlet 540 substantially in a gas (e.g., vapor) phase. Further, it may be beneficial for the refrigerant that is exiting the evaporator 80 to have little to no liquid present. Ideally, the refrigerant may be completely vaporized before exiting the evaporator 80.

To facilitate vaporization, the evaporator 80 may be equipped with a piezoelectric transmitter 560 (e.g., piezoelectric transducer, ultrasonic wave emitter, ultrasonic transducer, mechanical wave emitter). The piezoelectric transmitter 560 may emit mechanical waves (e.g., ultrasonic waves, sound waves, vibrations, vibration wave, etc.) into and/or at the evaporator tubes 290. As will be described in more detail below, the mechanical waves may improve heat transfer coefficient of the refrigerant in the evaporator 80 and, thus, heat transfer efficiency of the evaporator 80.

In some embodiments, the piezoelectric transmitter 560 may be coupled directly to the evaporator tubes 290 of the evaporator 80. In the current embodiment, the piezoelectric transmitter 560 is coupled to a single side of the evaporator 80 perpendicular to a direction of flow of the air 500. In some embodiments, there may be one or more piezoelectric transmitters 560 coupled to one or more sides of the evaporator 80 to provide for broader coverage of the mechanical waves. In some embodiments, the piezoelectric transmitter 560 may be some distance away from the evaporator tubes 290 and/or supported by a separate structure within the vapor compression system 72.

In any case, the mechanical waves output from the piezoelectric transmitter 560 may enhance nucleation of the refrigerant as it flows through the evaporator tubes 290. During nucleation, incipient vapor bubbles may form within the refrigerant. To form the vapor bubbles (e.g., to coax the vapor bubbles to grow), the heat transfer surface temperature (e.g., temperature at surface of the liquid refrigerant) may be higher than the saturation temperature of the liquid refrigerant. Further, pressure within the vapor bubbles may be higher than pressure in the liquid surrounding the vapor bubbles. However, surface tensions of the vapor bubbles may reduce likelihood of (e.g., block) the vapor bubble from bursting (e.g., imploding).

Typically, the vapor bubbles may occur at nucleation sites (e.g., surface imperfections) where the liquid refrigerant interfaces with an internal surface of the evaporator tubes 290. However, as mentioned above, the mechanical waves provided by the piezoelectric transmitter 560 may enhance (e.g., boost or catalyze) nucleation of the refrigerant. For example, along with vapor bubble formation at nucleation sites along the inner surface of the evaporator tubes 290, the mechanical waves may cause localized shockwaves and/or reverberations that create further nucleation sites within the refrigerant. The increase of nucleation sites may help increase amount of vapor bubbles formed (e.g., an increased rate of vapor bubble formation) within the liquid refrigerant.

Therefore, the refrigerant may form more vapor bubbles in a shorter period of time, thereby increasing the heat transfer coefficient. In this manner, a smaller temperature differential (e.g. temperature difference between the air 500 and the refrigerant) may drive the vaporization of the refrigerant, thereby decreasing the amount of time it takes for the refrigerant to vaporize (e.g., boil off). In other words, introducing mechanical waves may facilitate vaporizing the refrigerant over a shorter time span (e.g., increased rate of vaporization) and/or over a shorter distance of the evaporator tubes 290.

In fact, in some embodiments, this may enable implemented the evaporator 80 with a shorter length of the evaporator tubes 290 (e.g., tubing). As such, the evaporator 80, and by extension, the vapor compression system 72, may be manufactured with a decreased footprint (e.g., size). Further, due in part to the decreased footprint of the evaporator 80, implementation associated cost (e.g., component count and/manufacturing steps) of the vapor compression system 72 may also be reduced.

In some instances, the liquid refrigerant may include (e.g., carry) an oil. As such, during the use of the evaporator 80, fouling (e.g., fouling buildup) may occur when the oil carried by the refrigerant coats the interior surface of the evaporator tubes 290. This buildup of oil may provide for some amount of insulation between the refrigerant, the evaporator tubes 290, and the air 500. Therefore, the piezoelectric transmitter 560 may increase the heat transfer coefficient of the evaporator tubes 290 and liquid refrigerant by breaking up (e.g., disrupting, dispersing) the accumulation of oil on the interior surface of the evaporator tubes 290.

For example, the mechanical waves emitted from the piezoelectric transmitter may cause the formation of vapor bubbles. These vapor bubbles may discharge a jet of refrigerant when they implode. The force of the implosion may cause the oil buildup (e.g., fouling) to be lifted off of the interior surface of the evaporator tubes 290. Indeed, the reverberations and/or shockwaves discussed above with respect to enhanced nucleation may also aid in the dispersion of oil on the interior surface of the evaporator tubes 290.

Accordingly, because the dispersion of the oil buildup may increase the heat transfer coefficient (e.g., heat transfer) between the refrigerant, evaporator tubes 290, and air 500, the liquid refrigerant may vaporize (e.g., boil off) in a shorter period of time and/or over a shorter distance of the evaporator tubes 290. Therefore, the evaporator 80 may be manufactured with a reduced length of the evaporator tubes 290 (e.g., tubing) relative to an evaporator without the oil dispersion techniques discussed above. In this manner, the evaporator 80, and by extension, the vapor compression system 72, may be manufactured with a decreased footprint (e.g., size). Further, due in part to the decreased footprint of the evaporator 80, implementation associated cost (e.g., component count and/manufacturing steps) of the vapor compression system 72 may also be reduced.

As discussed above, the piezoelectric transmitter 560 may provide mechanical waves to elements of the evaporator 80 to increase the heat transfer coefficient (e.g., heat transfer) between the refrigerant and the air 500. In some embodiments, to capitalize on the effects (e.g., enhanced nucleation and oil dispersion effects) of the mechanical waves on the evaporator tubes 290, the piezoelectric transmitter 560 may emit mechanical waves with a frequency that matches the resonant frequency of the evaporator 80. More specifically, the emitted mechanical waves may match a resonant frequency of the evaporator tubes 290 and/or the refrigerant flowing through the evaporator tubes 290. In some embodiments, as discussed in further detail below, the resonant frequency may change along the length of the evaporator tubes 290. As such, the piezoelectric transmitter 560 may provide different frequencies to match the different frequencies along the length of the evaporator tubes 290.

Matching the resonant frequency of the refrigerant and/or the evaporator tubes 290 with the mechanical waves emitted by the piezoelectric transmitter 560 may result in larger reverberations of the evaporator 80. Essentially, if the frequency of the mechanical waves matches the resonant frequency of the evaporator 80, the mechanical waves may drive the evaporator 80 to reverberate (e.g., oscillate) with higher amplitudes. This may also result in a higher heat transfer coefficient of the evaporator 80 as it may provide for an increased oil dispersion rate and/or an increased refrigerant nucleation rate. Moreover, improving the oil dispersion techniques and/or the nucleation techniques, as discussed above, via mechanical waves of the piezoelectric transmitter may result in faster vaporization of the refrigerant over a shorter length of the evaporator tubes 290, thus enabling the manufacturing of the evaporator 80 with reduced tubing length. In this manner, the evaporator 80, and by extension, the vapor compression system 72, may be manufactured with a decreased footprint (e.g., size). Further, due in part to the decreased footprint of the evaporator 80, implementation associated cost (e.g., component count and/ manufacturing steps) of the vapor compression system 72 may also be reduced.

Figure 7:
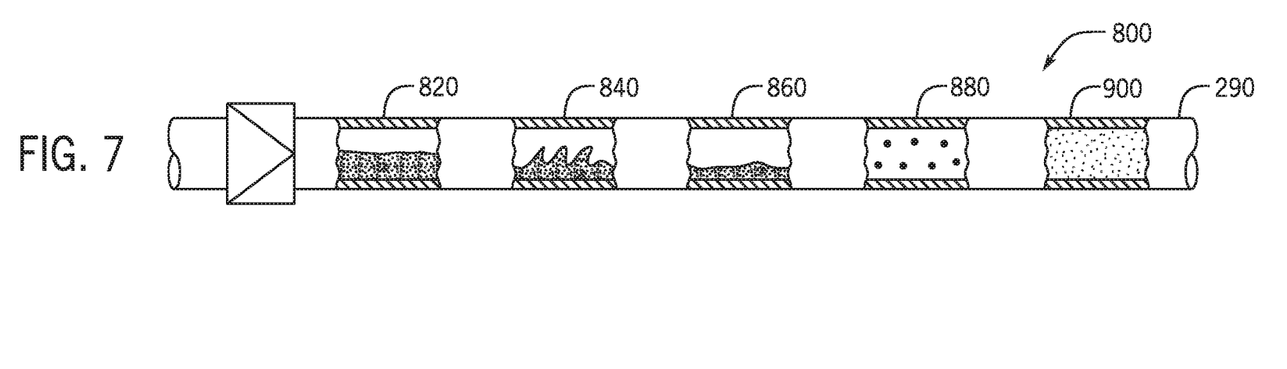
FIG. 7 illustrates phases of refrigerant along a tube in the evaporator of FIG. 6, in accordance with an embodiment.

As the refrigerant progresses through the evaporator tubes 290 from the inlet 520 to the outlet 540 and vaporizes, the refrigerant may exhibit distinct physical characteristics. For example, as seen in FIG. 7, cut-outs along the length of the evaporator tubes 290 depict a vaporization progression 800 of the refrigerant as it progresses through the evaporator tubes 290. More specifically, the different stages of the vaporization progression 800 can be seen in a first cut-out 820, a second cut-out 840, a third cut-out 860, a fourth cut-out 880, and a fifth cut-out 900.

For example, the first cut-out 820 shows the refrigerant in a substantially liquid state, which may be at a location near the inlet 520. The fifth cut-out 900 shows the refrigerant in a substantially gaseous (e.g., vapor) state, which may be at a location near the outlet 540. Accordingly, the first cut-out 820 may depict the refrigerant as it enters the evaporator 80 through the inlet 520. Therefore, the refrigerant depicted in the first cut-out 820 may have been subjected to mechanical waves emitted from the piezoelectric transmitter 560 for a minimal length of time. In some embodiments, the first cut-out 820 may depict the refrigerant before it has been subjected to mechanical waves of the piezoelectric transmitter 560.

The substantially flat surface of the refrigerant seen in the first cut-out 820 may be less conducive to heat transfer. For example, heat transfer may increase as the heat transfer surface area (e.g., surface area of refrigerant) increases. However, a solid, flat surface as seen in the first cut-out 820 has minimal surface area. Thus, to increase heat transfer, it may be beneficial to increase the surface area of the refrigerant by disrupting the flat surface of the refrigerant seen in the first cut-out 820.

As discussed above, the piezoelectric transmitter 560 may apply mechanical waves to the evaporator tubes 290 and the refrigerant flowing within the evaporator tubes 290. The mechanical waves may induce waves (e.g., ripples, disturbances, excitations, etc.) on the liquid film (e.g., surface, fluid film) of the refrigerant located between the liquid and the vapor refrigerant as seen in the second cut-out 840. The waves induced by the mechanical waves may cause the liquid refrigerant to increase in surface area, thereby increasing the liquid surface area available heat transfer and, thus, the rate at which the liquid refrigerant vaporizes. Results of the waves may be observed in the third cut-out 860 as there is less liquid refrigerant, and more vapor refrigerant, relative to the first cut-out 820. Although not shown, the film of the liquid refrigerant depicted in the third cut-out 860 may also experience waves as the refrigerant continues to receive mechanical waves from the piezoelectric transmitter 560.

As seen in the fourth cut-out 880 and the fifth cut-out 900, as the refrigerant continues to vaporize with the aid of the piezoelectric transmitter 560, the refrigerant may transition from a liquid phase to a gas phase with droplets of different sizes (e.g., vapor). Indeed, as the refrigerant progresses through the evaporator tubes 290 toward the outlet 540, the refrigerant may continue to vaporize and the vapor droplets may become smaller and more diffused. Furthermore, it should be noted that the figures are not necessarily to proportion. For example, although each cut-out (e.g., 820, 840, 860, 880, and 900) depicts each phase of the vaporization progression 800 as equal in length, they may in fact differ in length. Further, there may be more phases of the vaporization progression 800 not depicted in the current FIG. 7. In other words, the transition of the refrigerant from the liquid phase to the gas phase (e.g., the vaporization progression 800) may be a continuous process and not discrete as currently depicted.

Yet further, in some embodiments, the piezoelectric transmitter 560 may only provide mechanical waves to appropriate portions of the evaporator tubes 290, which may facilitate reducing electrical power used to operate the piezoelectric transmitter 560. For example, if a portion of the refrigerant flowing through the evaporator tubes 290 is substantially vapor (e.g., refrigerant near the outlet 540 of the evaporator tubes 290), the piezoelectric transmitter 560 may not apply mechanical waves to that portion of the refrigerant. Further still, because the physical state (e.g., phase, material composition, etc.) of the refrigerant may affect the resonant frequency of portions of the evaporator tubes 290 differently, the piezoelectric transmitter 560 may apply different frequencies of the mechanical waves to different portions of the evaporator tubes 290 based on the resonant frequencies of the different portions. As such, there may be one or more piezoelectric transmitters 560, which transmit one or more frequencies to one or more portions of the evaporator tubes 290.

In some embodiments, the one or more piezoelectric transmitters 560 may be preprogrammed to supply certain frequencies. However, in some embodiments, one or more piezoelectric transmitters 560 may be coupled to a controller (e.g., control panel 82) which may gather data from one or more sensors (e.g., sensors 420), for example, indicative of the resonant frequency of one or more portions of the evaporator tubes 290. The controller may then adjust the frequency output of the appropriate piezoelectric transmitter 560 based on the gathered data. Furthermore, in the current embodiment, the piezoelectric transmitter 560 emits mechanical waves to promote heat transfer as described above. In some embodiments, however, the evaporator 80 may utilize any suitable device (e.g., an external vibration device) which may supply a stimulus at a suitable frequency (or vibration rate) similarly as described above with respect to the piezoelectric transmitter 560.

As discussed above, the vapor compression system 72 may utilize the evaporator 80, which is enhanced with the piezoelectric transmitter 560, to increase the rate of vaporization of the refrigerant as it flows through the evaporator tubes 290. By way of example, the flow diagram shown in FIG. 8 describes a process 1000 for operating an evaporator 80. As discussed above, refrigerant may flow from the condenser 76 to the evaporator 80. The evaporator 80 may receive the refrigerant through the inlet 520 (block 1020). Indeed, as discussed above, the refrigerant entering the inlet 520 may have a reduced temperature and pressure. As such, the refrigerant may be substantially in a liquid state.

Figure 8:
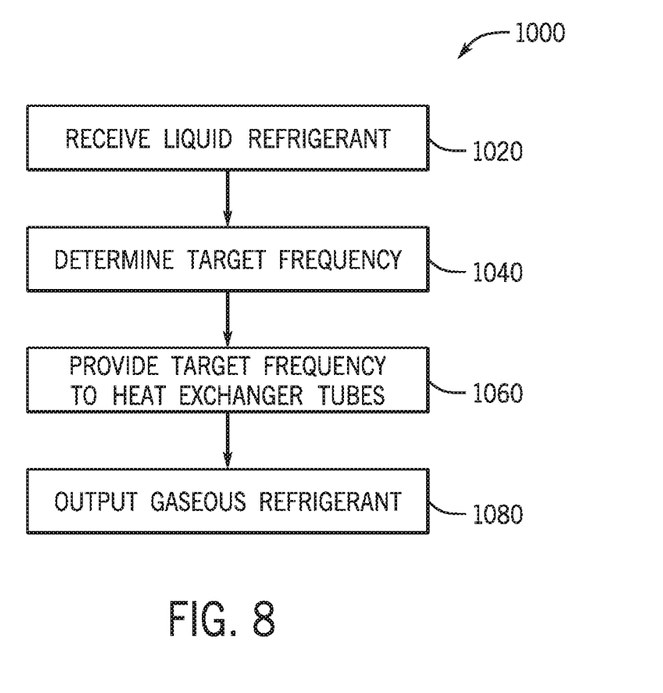
FIG. 8 is a flow diagram describing a process for operating the evaporator of FIG. 6, in accordance with an embodiment.

The control panel 82 may determine a target frequency (block 1040). In some embodiments, the control panel 82 may determine a target frequency based on information provided by an operator, for example, via the control panel 82. Further, as discussed above, one or more target frequencies may be determined based one or more resonant frequencies of one or more portions of the evaporator 80, for example, based on information received by the one or more sensors 420.

Based on the target frequencies, the control panel 82 may instruct the piezoelectric transmitter 560 (e.g., a vibration emitter, an ultrasonic wave emitter, sound wave emitter, mechanical wave emitter, etc.) to output mechanical waves (process block 1060). In some embodiments, the piezoelectric transmitter 560 may provide mechanical vibrations, ultrasonic waves, sound waves, and/or any suitable mechanical wave to enhance nucleation, and overall increase a heat transfer coefficient in line with the techniques discussed above. For example, the piezoelectric transmitter 560 may enhance nucleation, disperse oil, and increase a heat transfer surface of the refrigerant. As the refrigerant continues through the evaporator tubes 290 of the evaporator 80 while exchanging heat with the air 500 pulled across the evaporator tubes 290, the refrigerant may be subjected to an output of the piezoelectric transmitter 560 (e.g., the mechanical waves). Once the refrigerant reaches the outlet 540 of the evaporator 80, the refrigerant may be substantially, if not completely, vapor.

The evaporator 80 may output the gaseous (e.g., vaporized) refrigerant (block 1080). After the refrigerant has exited the evaporator 80, the refrigerant may be routed to the compressor 74 and continue through the closed refrigerant loop 130 as described above. Controlling the vapor refrigerant to a high level of fidelity as it exits the evaporator 80 may help to optimize the performance of the vapor compression system 72. In other words, it may be beneficial for the refrigerant to be substantially, if not completely, vapor as it exits the evaporator 80 and to not have uncertain amounts of refrigerant in the liquid phase. As discussed above, complete vaporization of the refrigerant may also help to maximize heat transfer between the refrigerant/evaporator tubes 290 and the air 500.

One or more of the disclosed embodiments, alone or in combination, may provide one or more technical effects useful to improve manufacture and/or operation of heat exchangers, such as evaporators. In general, embodiments of the present disclosure include a mechanical wave device (e.g., piezoelectric transmitter), which may provide heat exchanger tubes (e.g., evaporator tubes) with mechanical waves (e.g., ultrasonic waves). The mechanical waves may promote heat transfer between refrigerant flowing through the heat exchanger tubes and fluid (e.g., air) being drawn across the heat exchanger tubes in multiple ways. For example, the mechanical waves may enhance nucleation of the refrigerant within the heat exchanger tubes, disperse fouling on the internal surface of the heat exchanger tubes, and/or increase a heat transfer surface area of the refrigerant within the heat exchanger tubes. Overall, these affects may increase the heat transfer coefficient of the heat exchanger tubes and the refrigerant within the heat exchanger tubes. The increased heat transfer coefficient may increase the rate at which the refrigerant vaporizes as it flows through the heat exchanger tubes. In this manner, the increased rate of vaporization of the refrigerant may enable length of the heat exchanger tubes used to fully vaporize the refrigerant to be reduced. Accordingly, due at least to the reduced length of heat exchanger tubes, the heat exchanger may be manufactured with reduced implementation associated costs, such as footprint and/or weight. The technical effects and technical problems in the specification are exemplary and are not limiting. It should be noted that the embodiments described in the specification may have other technical effects and can solve other technical problems.

This written description uses examples to disclose the current embodiments, including the best mode, and also to enable any person skilled in the art to practice the current embodiments, including making and using any devices or systems and performing any incorporated methods. The patentable scope of the current embodiments are defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A cooling system, comprising:
    an evaporator, wherein the evaporator comprises:
        an evaporator tube, wherein the cooling system is configured to circulate refrigerant through the evaporator tube to facilitate heat exchange between the refrigerant and fluid surrounding the evaporator tube; and
        a mechanical wave emitter configured to output mechanical waves to the evaporator tube; and
    a control panel communicatively coupled to the mechanical wave emitter, wherein the control panel is configured to determine a target frequency of the mechanical waves based at least in part on a resonant frequency of the evaporator tube and instruct the mechanical wave emitter to output the mechanical waves to enhance nucleation of the refrigerant in the evaporator tube.

2. The cooling system of claim 1, comprising:
    a compressor fluidly coupled to the evaporator, wherein the compressor is configured to compress the refrigerant received from the evaporator;
    a condenser fluidly coupled to the compressor, wherein the condenser is configured to facilitate heat exchange between the refrigerant received from the compressor and a surrounding fluid; and
    an expansion device fluidly coupled between the condenser and the evaporator, wherein the expansion device is configured to expand the refrigerant received from the condenser.

3. The cooling system of claim 1, wherein the control panel is configured to
    instruct the mechanical wave emitter to output the mechanical waves at the target frequency to the evaporator tube.

4. The cooling system of claim 1 comprising another mechanical wave emitter configured to output other mechanical waves to the evaporator tube;
    wherein the control panel is configured to:
        determine the target frequency of the mechanical waves based at least in part on the resonant frequency expected to be present in a portion of the evaporator tube;
        instruct the mechanical wave emitter to output the mechanical waves at the target frequency targeted at the portion of the evaporator tube;
        determine another target frequency of the other mechanical waves based at least in part on another resonant frequency expected to be present in another portion of the evaporator tube, wherein the other target frequency is different from the target frequency; and
        instruct the other mechanical wave emitter to output the other mechanical waves at the other target frequency targeted at the other portion of the evaporator tube.

5. The cooling system of claim 1, wherein the control panel is configured to:
    determine at least one of:
        state of the refrigerant expected to be present at a portion of the evaporator tube;
        amount of the refrigerant expected to be present at the portion of the evaporator tube; and
        material composition of the portion of the evaporator tube; and
    determine the target frequency based at least in part on the state of the refrigerant expected to be present, the amount of the refrigerant expected to be present, the material composition of the portion of the evaporator tube, or any combination thereof.

6. The cooling system of claim 1, wherein the control panel is configured to instruct the mechanical wave emitter to output the mechanical waves to disrupt a fluid film on a surface of the refrigerant in a liquid state.

7. The cooling system of claim 1, wherein the control panel is configured to instruct the mechanical wave emitter to output the mechanical waves to disperse fouling buildup in the evaporator tube.

8. The cooling system of claim 1, wherein the mechanical waves comprise an ultrasonic wave, a sound wave, a vibration wave, or any combination thereof.

9. The cooling system of claim 1, wherein the mechanical wave emitter comprises a piezoelectric transmitter, a piezoelectric transducer, an ultrasonic wave emitter, an ultrasonic transducer, or any combination thereof.

10. A method for operating a cooling system, comprising:
    determining, using a control system of the cooling system, a first target frequency of a first mechanical wave to be output from a mechanical wave emitter to an evaporator tube as refrigerant is circulated through the evaporator tube;
    determining a first resonant frequency expected to be present at a first portion of the evaporator tube, wherein determining the first target frequency comprises determining the first target frequency based at least in part on the first resonant frequency; and
    instructing, using the control system, the mechanical wave emitter to output the first mechanical wave with the first target frequency to facilitate heat exchange between the refrigerant and fluid surrounding the evaporator tube by agitating the refrigerant.

11. The method of claim 10, comprising:
    receiving the refrigerant in the evaporator tube from an expansion device, wherein the refrigerant is in a liquid state when received by the evaporator tube;
    converting the refrigerant from the liquid state to a gaseous state along a length of the evaporator tube by extracting heat from the fluid surrounding the evaporator tube; and outputting the refrigerant from the evaporator tube to a compressor, wherein the refrigerant is in the gaseous state when output from the evaporator tube.

12. The method of claim 10, comprising:

determining, using the control system, a second target frequency of a second mechanical wave to be output from the mechanical wave emitter targeted at a second portion of the evaporator tube; and instructing, using the control system, the mechanical wave emitter to output the second mechanical wave with the second target frequency to facilitate heat exchange between the refrigerant and fluid surrounding the evaporator tube by agitating the refrigerant as the refrigerant flows through the second portion of the evaporator tube, wherein instructing the mechanical wave emitter to output the first mechanical wave comprises instructing the mechanical wave emitter to output the first mechanical wave targeted at the first portion of the evaporator tube to facilitate heat exchange between the refrigerant and fluid surrounding the evaporator tube by agitating the refrigerant as the refrigerant flows through the first portion of the evaporator tube.

13. The method of claim 10, wherein determining the first resonant frequency comprises:

determining at least one of:
state of the refrigerant expected to be present at the first portion of the evaporator tube;
amount of the refrigerant expected to be present at the first portion of the evaporator tube; and
material composition of the first portion of the evaporator tube; and determining the first resonant frequency based at least in part on the state of the refrigerant expected to be present, the amount of the refrigerant expected to be present, the material composition of the first portion of the evaporator tube, or any combination thereof.

14. The method of claim 10, wherein instructing the mechanical wave emitter to output the first mechanical wave comprise instructing the mechanical wave emitter to output an ultrasonic wave, a sound wave, a vibration wave, or any combination thereof.

15. A tangible, non-transitory, computer-readable medium that stores instructions executable by one or more processors of a cooling system, wherein the instructions comprise instructions to:

determine, using the one or more processors, a first target frequency of a first mechanical wave to be output from a mechanical wave emitter to an evaporator tube as refrigerant is circulated through the evaporator tube;

determine a first resonant frequency expected to be present at a first portion of the evaporator tube, wherein the instructions to determine the first target frequency comprise instructions to determine the first target frequency based at least in part on the first resonant frequency; and instruct, using the one or more processors, the mechanical wave emitter to output the first mechanical wave with the first target frequency to facilitate heat exchange between the refrigerant and fluid surrounding the evaporator tube by agitating the refrigerant.

16. The tangible, non-transitory, computer-readable medium of claim 15, comprising instructions to:

determine, using the one or more processors, a second target frequency of a second mechanical wave to be output from the mechanical wave emitter targeted at a second portion of the evaporator tube; and instruct, using the one or more processors, the mechanical wave emitter to output the second mechanical wave with the second target frequency to facilitate heat exchange between the refrigerant and fluid surrounding the evaporator tube by agitating the refrigerant as the refrigerant flows through the second portion of the evaporator tube, wherein the instructions to instruct the mechanical wave emitter to output the first mechanical wave with the first target frequency comprise instructions to instruct the mechanical wave emitter to output the first mechanical wave targeted at the first portion of the evaporator tube to facilitate heat exchange between the refrigerant and fluid surrounding the evaporator tube by agitating the refrigerant as the refrigerant flows through the first portion of the evaporator tube.

17. The tangible, non-transitory, computer-readable medium of claim 15, wherein the instructions to determine the first resonant frequency expected to be present at the first portion of the evaporator tube comprise instructions to:

determine at least one of:
state of the refrigerant expected to be present at the first portion of the evaporator tube;
amount of the refrigerant expected to be present at the first portion of the evaporator tube; and
material composition of the first portion of the evaporator tube; and determine the first resonant frequency based at least in part on the state of the state of the refrigerant expected to be present, the amount of the refrigerant expected to be present, the material composition of the portion of the evaporator tube, or any combination thereof.

18. The tangible, non-transitory, computer-readable medium of claim 15, wherein the instructions to instruct the mechanical wave emitter to output the first mechanical wave comprise instructions to instruct the mechanical wave emitter to output an ultrasonic wave, a sound wave, a vibration wave, or any combination thereof.

* * * * *